No. 671,332. Patented Apr. 2, 1901.
A. T. COLLIER.
VEHICLE TIRE.
(Application filed Dec. 10, 1900.)

(No Model.) 3 Sheets—Sheet 1.

No. 671,332. Patented Apr. 2, 1901.
A. T. COLLIER.
VEHICLE TIRE.
(Application filed Dec. 10, 1900.)

(No Model.) 3 Sheets—Sheet 2.

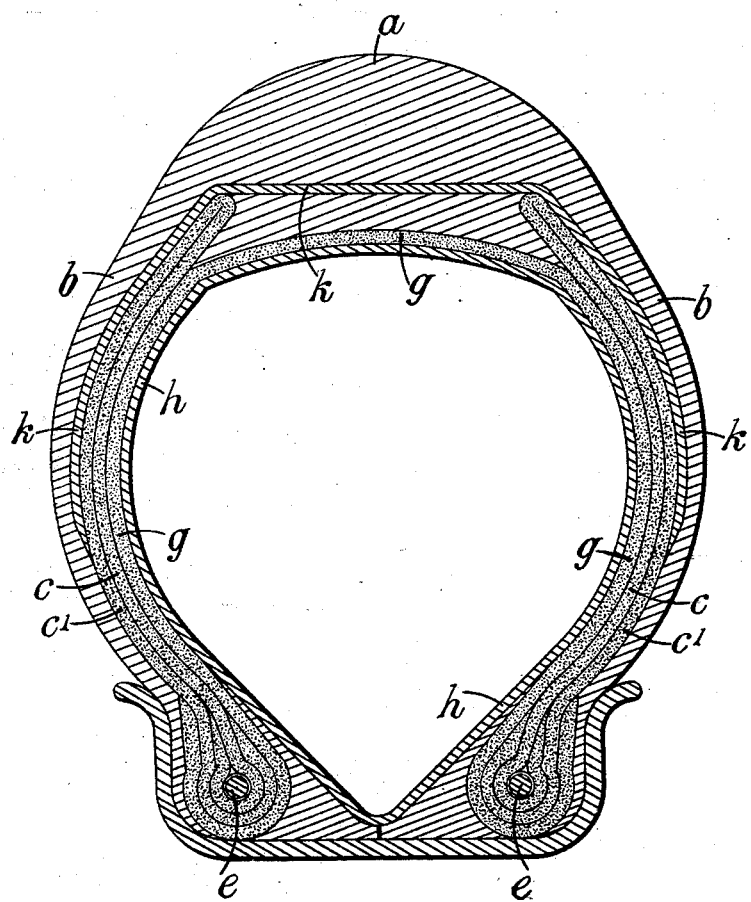

UNITED STATES PATENT OFFICE.

ARTHUR THOMAS COLLIER, OF ST. ALBANS, ENGLAND, ASSIGNOR OF ONE-HALF TO EDGAR OLIVER GOSS, OF LONDON, ENGLAND.

VEHICLE-TIRE.

SPECIFICATION forming part of Letters Patent No. 671,332, dated April 2, 1901.

Application filed December 10, 1900. Serial No. 39,373. (No model.)

*To all whom it may concern:*

Be it known that I, ARTHUR THOMAS COLLIER, a subject of the Queen of Great Britain, residing at St. Albans, England, have invented certain new and useful Improvements in Vehicle-Tires, of which the following is a specification.

This invention relates to pneumatic tires for cycles, motor-cars, carriages, omnibuses, and other road-vehicles; and the said invention comprises an improved construction of that type of tire wherein a solid tire or tread—for example, a tread of india-rubber or like elastic or resilient material—is combined with a pneumatic chamber.

According to my invention the covering for the inflatable tube comprises a solid tread or tire of india-rubber or like elastic material, at or within the sides of which are arranged strips of canvas or other suitable fabric consisting of a single layer or of two or more layers suitably cemented together, and the inner edges of the said canvas strips—that is to say, the edges thereof which are nearest the tread—are secured together by transverse ligaments—such as threads, cords, or laces—arranged at a suitable distance apart and extending through the material of the tread. These transverse threads, cords, or laces may in some cases be replaced by netting of open mesh or like fabric. The said transverse threads, cords, or laces can be passed around circumferential cores or rings arranged in the inner edges of the said canvas strips, or they can be secured to the said canvas strips in any other suitable manner—for example, by means of india-rubber solution. The said covering can, moreover, be lined with one or more layers of canvas to further assist in binding the canvas side walls together.

Figure 1:
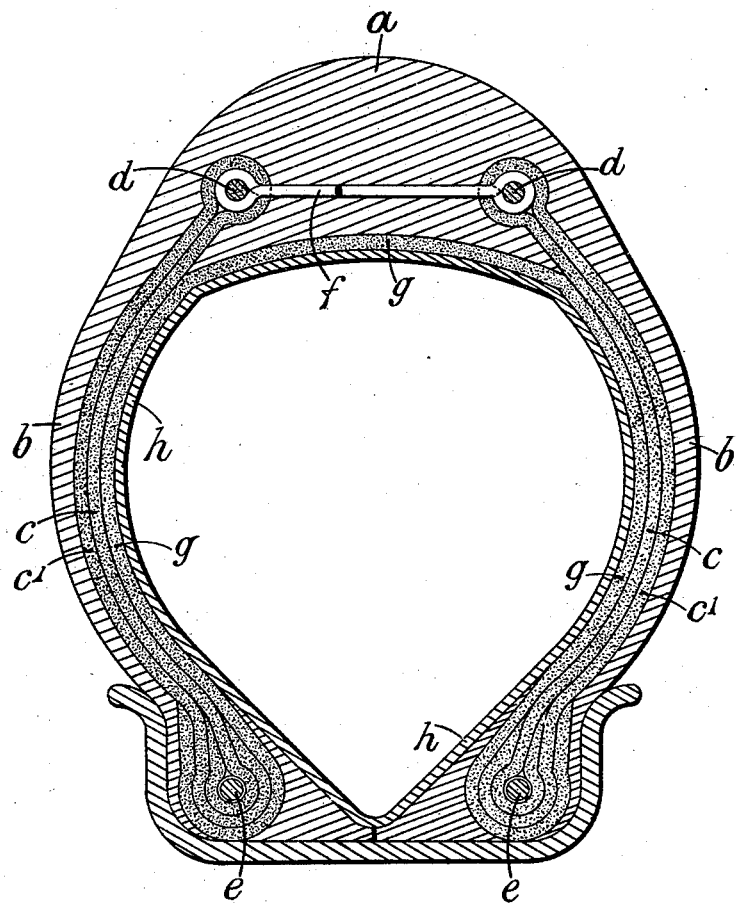
Figure 2:
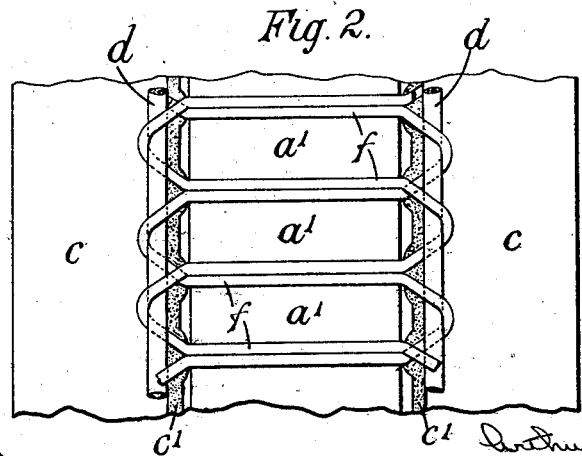

In the accompanying drawings, Figure 1 is a transverse section of my improved tire. Fig. 2 is a plan, and Fig. 3 a transverse section illustrating the tire in the process of construction. Fig. 4 is a similar section to Fig. 1, showing a modification.

Like letters indicate corresponding parts in the different figures.

In the preferred construction the tire comprises a solid rubber tread $a$, having extensions $b$, which inclose strips of canvas $c$ $c'$ on each side, the said strips each consisting of one or more layers, as required.

$d$ $d$ are cores, of cord, tape, or the like, inclosed in the inner edges or folds of the canvas strips, and $e$ $e$ are other cores, of wire or the like, stranded or otherwise arranged in the outer edges or folds of the canvas strips.

$f$ denotes transverse threads, cords, or laces which connect the cores $d$ together. The said transverse threads or cords are arranged at suitables distances apart, as shown at Fig. 2, so as to enable the india-rubber or like material forming the tread to extend between them and efficiently unite the inner and outer parts of the said tread.

$g$ is an inner layer or layers of canvas extending within the tread from one wire $e$ to the other.

$h$ is the air-tube.

Figure 3:
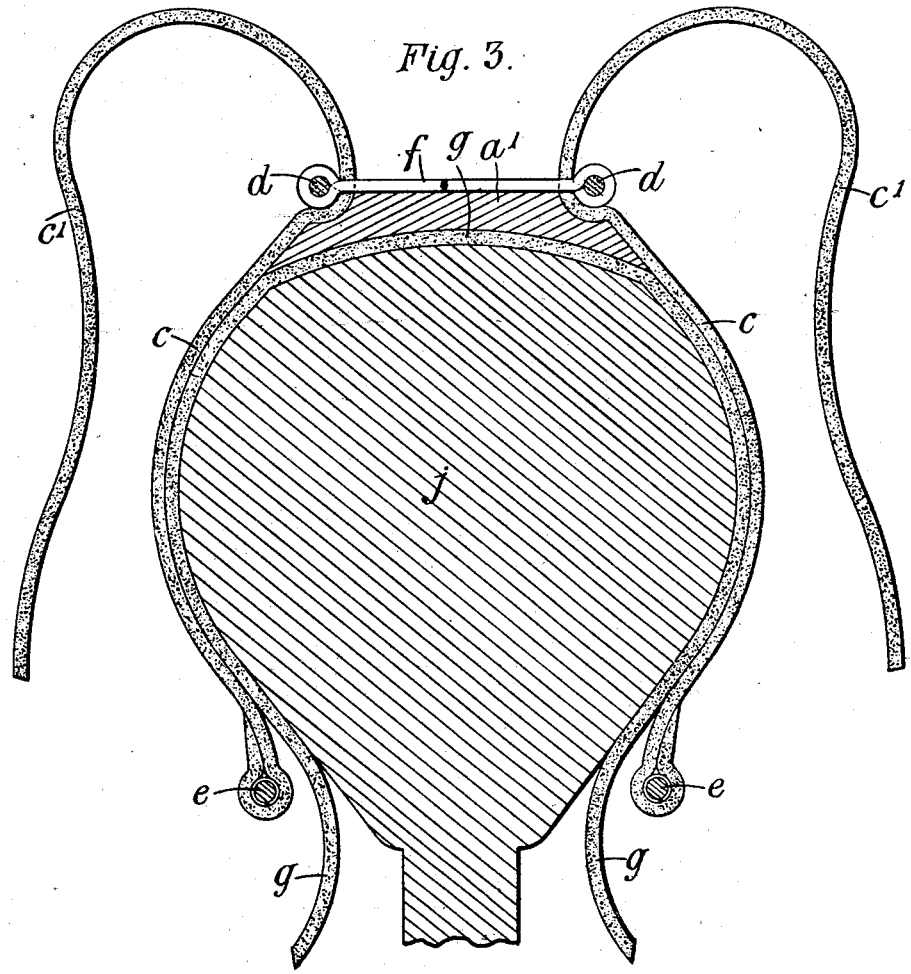

My improved tire is preferably constructed as illustrated in Figs. 2 and 3, viz: Around a mandrel $j$ of suitable shape is first placed the layer or layers of canvas $g$, and on the upper surface of the said canvas is built up the inner portion $a'$ of the tread in unvulcanized india-rubber compound, as shown. The layer or layers $c$ of canvas are then placed in position, together with the rings or circumferential cores $d$, the layer or layers of canvas $c$ being fastened by india-rubber solution prepared for vulcanization to the layer or layers $g$. Two laces or threads or bundles of threads $f$ are then threaded from opposite sides of the tire through the canvas $c$ under one core $d$ and over the other core, then obliquely around the cores and again through the canvas, and so on all around the tire. The part $c'$ of the layer or layers of canvas $c$ is then folded down and fastened, by means of the india-rubber solution above mentioned, to the part thereof already solutioned to the canvas $g$, the edges of both the inner and outer parts $c$ $c'$ of the said canvas being folded around the core or wire $e$ in opposite directions, and over both parts on each side is folded the edge of the canvas $g$ in the opposite direction to the part $c'$, the whole being secured by india-rubber solution, as aforesaid. The unvulcanized rubber to form the outer part of the tread $a$ and the extensions $b$ is then applied, so as to fill up the spaces between the lacing $f$, and the whole placed in a mold and vulcanized.

In the modification shown in Fig. 4 the circumferential cores or rings $d$ are omitted and the lacing $f$ replaced by transverse cords $k$, which are secured to the strips $c$ by the india-rubber in the process of vulcanization.

If desired, the tread can be made separately, with or without the extensions $b$, and afterward used in building up the tire, which can then be vulcanized in its finished state.

It is obvious that instead of folding the outer edges of the strips $c\ c'\ g$ around a wire $e$, as shown, the edges of the covering can be finished in any other suitable manner to suit the method of securing the tire to the rim employed in any particular case.

What I claim is—

1. In a tire, the combination of an air-chamber, a solid tread, strips of fabric inclosing the sides of the air-chamber, and ligaments connecting said strips and passing through the tread, substantially as described.

2. In a tire, the combination of an air-tube, a solid-rubber tread, strips of fabric inclosing the sides of the air-tube, cores in said strips, and ligaments passing around said cores and through the tread, substantially as described.

3. In a tire, the combination of an air-tube, a solid-rubber tread, strips of fabric inclosing the side of the air-tube and extending partially into the said tread, cores in the edges of the said strips, and ligaments passing around said cores and through the tread, substantially as described.

4. In a tire, the combination of an air-tube, a solid-rubber tread, strips of fabric inclosing the sides of the air-tube, cores in the edges of said strips, ligaments passing around said cores and through the tread, and a strip of fabric secured between the rubber tread and lateral strips of fabric and the air-tube, substantially as described.

5. In a tire, the combination of an air-tube, a solid-rubber tread, strips of fabric inclosing the sides of the air-tube, and extending partially into the said tread, cores in the edges of the strips, ligaments passing around said cores and through the tread for securing the tread to the strips of fabric, and an outer covering of rubber to protect the said strips, substantially as described.

6. In a tire, the combination of an air-tube, a solid-rubber tread, strips of fabric inclosing the sides of the air-tube, ligaments connecting said strips and passing through the tread, and a strip of fabric secured between the rubber tread and the air-tube, substantially as described.

7. The herein-described method of manufacturing an outer tire or covering for inclosing an air-tube, consisting in first placing fabric around a mandrel, building up unvulcanized india-rubber on such fabric, applying strips of fabric to the sides of said india-rubber, connecting said strips together by ligaments so as to leave spaces between said ligaments, applying unvulcanized india-rubber to complete said tread and to form the exterior of said covering, placing the whole in a mold and vulcanizing the same.

In testimony whereof I have hereunto set my hand in presence of two witnesses.

ARTHUR THOMAS COLLIER.

Witnesses:
CONRAD K. VALKENSTEIN,
ALEXANDER W. ALLEN.